US006444759B2

(12) United States Patent
Datta et al.

(10) Patent No.: US 6,444,759 B2
(45) Date of Patent: Sep. 3, 2002

(54) RUBBER VULCANIZATES HAVING IMPROVED AGEING PROPERTIES

(75) Inventors: Rabindrah Nath Datta, Deventer; Auke Gerardus Talma, Bathmen, both of (NL)

(73) Assignee: Flexsys B.V., Deventer (NL)

( * ) Notice: Subject to any disclaimer, the term of this patent is extended or adjusted under 35 U.S.C. 154(b) by 0 days.

(21) Appl. No.: 09/808,817

(22) Filed: Mar. 14, 2001

(30) Foreign Application Priority Data

Mar. 17, 2000 (EP) .............................. 00200987

(51) Int. Cl.$^7$ .............................. C08K 5/17; C08K 5/09; C08L 7/00; C08L 9/00
(52) U.S. Cl. ........................ 525/346; 525/382
(58) Field of Search ................. 525/346, 347, 525/343, 382

(56) References Cited

U.S. PATENT DOCUMENTS

| | | | | |
|---|---|---|---|---|
| 3,968,080 A | * | 7/1976 | Merten | |
| 4,281,085 A | * | 7/1981 | Ikeda | ........................ 525/343 |
| 4,647,328 A | * | 3/1987 | Rhee | ........................ 524/526 |
| 4,764,547 A | * | 8/1988 | Hatanaka | .................... 523/215 |

FOREIGN PATENT DOCUMENTS

| | | | |
|---|---|---|---|
| EP | 0 005 617 | 5/1979 | ............. C08L/9/06 |
| GB | 365493 | 1/1932 | ............. C08K/5/19 |
| WO | WO 98/55544 | 12/1998 | ............. C08K/5/18 |
| WO | WO 99/48964 | 9/1999 | ............. C08K/5/20 |

OTHER PUBLICATIONS

Rubber Technology Handbook; Dr. Werner Hofmann; Preface and pp. 294–307.
Bull. Korean Chem. Soc. 19; Influence of Wax on Migration of Antiozonants in NR Vulcanizates; Sung–Seen Choi pp. 1121–1124.
Rubber Chemistry and Technology; Studies on a New Antiversion Agent to Sulfur Vulcanization of Diene Rubbers; A.H.M. Schotman; P.J.C. Van Haeren; A.J.m. Weber; F.G.H. Van Wijk; J.W. Hofstraat; A.G. Talma; A. Steenbergen; R.N. Datta; pp. 727–741.

* cited by examiner

Primary Examiner—Christopher Henderson
(74) Attorney, Agent, or Firm—Louis A. Morris

(57) ABSTRACT

The invention relates to a vulcanizable rubber composition comprising a rubber, sulfur or a sulfur donor, a vulcanization accelerator, a protective agent and 0.1 phr or more of an N,N'-disubstituted p-phenylenediamine protective agent is present in the form of a salt with an acid, and the composition does not comprise an elastomeric copolymer having glycidyl groups. The invention also relates to a vulcanization process comprising mixing and heating said rubber composition and to an article of manufacture comprising the rubber vulcanizate obtained by said process. Preferably, the acid is a $C_1$–$C_{24}$ monocarboxylic acid or a $C_2$–$C_{24}$ dicarboxylic acid, more preferably a $C_{12}$–$C_{20}$ fatty acid such as stearic acid. Most preferably, the protective agent is 6PPD.

6 Claims, No Drawings

RUBBER VULCANIZATES HAVING IMPROVED AGEING PROPERTIES

CROSS REFERENCE TO RELATED APPLICATION

This application claims priority from European Patent Application Serial No. 0020097.6, filed Mar. 17, 2000.

BACKGROUND OF THE INVENTION

1. Field of the Invention

The invention relates to a vulcanizable rubber composition comprising a rubber, sulfur or a sulfur donor, a vulcanization accelerator, and a protective agent. It further relates to a vulcanization process comprising mixing and heating said rubber composition, and to an article of manufacture comprising the rubber vulcanizate obtained by said process.

2. Prior Art

Vulcanizing rubber compositions by heating with sulfur or a sulfur donor, a vulcanization accelerator, and a protective agent has been known in the art for many years.

Protective agents are used to protect the rubber vulcanizate against various forms of ageing, fatigue, and ozone. For example, exposure of pneumatic tires to ozone leads to the formation of ozone cracks in particular in the side walls of the tire. A well-known class of protective agents are N,N'-disubstituted, in particular N-alkyl,N'-phenyl p-phenylenediamine derivatives. These N,N'-disubstituted p-phenylenediamine derivatives typically are also referred to as antidegradants, antiozonants or antioxidants. The reader is directed to Hofmann, *Rubber Technology Handbook*, Hanser Publishers, Munich 1989, pp. 264–277, in particular pp. 269–270. These antidegradants are commercially available inter alia under the trademark Santoflex® sold by Flexsys. In the rubber industry, the most frequently used antidegradant is N-(1,3-dimethylbutyl)-N'-phenyl-p-phenylenediamine or 6PPD. It is to be noted that p-phenylenediamine itself and N-phenyl-p-phenylenediamine or 4-aminodiphenylamine (4-ADPA) are protective agents to some extent, but that these compounds are scorchy and therefore not used in practice.

Rubber vulcanizates having acceptable physical properties can be obtained using the conventional sulfur-vulcanization process. Said vulcanizates are used in a wide variety of applications, for example in various portions of tires (e.g. sidewalls as mentioned above) and in other industrial rubber goods such as hoses and belts. However, during the service life of said vulcanizates the protective agent has to migrate to the surface of the vulcanizate in order to provide protection against in particular ozone. The migration rate of protective agents dictates the lifetime of rubber articles. The faster the migration, the better the initial protection. However, fast migration to the surface of the protective agent will have a negative effect on long-term protection, since the antidegradant will be lost due to surface leaching and volatilization. This phenomenon is more pronounced in natural rubbers than in styrene-butadiene rubbers. With respect to migration, the reader is referred to S.-S. Choi, *Bull. Korean Chem. Soc.*, 19 (1998), 1121–1124. Like styrene-butadiene rubbers, filler-reinforced rubbers are less prone to blooming of the protective agent.

Hence, there is a need in the art for a way of controlling the migration rate of the protective agent thereby improving long-term protection of the rubber vulcanizate. Preferably, the other properties of the rubber vulcanizate—such as scorch time, optimum vulcanization time, abrasion resistance, etc.—should remain unchanged or even better, be improved as well. Surprisingly, we have found a solution to this problem.

SUMMARY OF THE INVENTION

In one embodiment, the present invention is a vulcanizable rubber composition comprising a rubber, sulfur or a sulfur donor, a vulcanization accelerator, a protective agent and 0.1 phr or more of an N,N'-disubstituted p-phenylenediamine protective agent present in the form of a salt with an acid, said composition not comprising an elastomeric copolymer having glycidyl groups.

In a second embodiment the present invention is a vulcanization process comprising mixing and heating the above rubber composition at a temperature of 110–220° C. for a period of up to 24 hours with the addition of 0.1 phr or more of the salt of an N,N'-disubstituted p-phenylenediamine protective agent with an acid during mixing of the rubber composition.

In a third embodiment the present invention is an article of manufacture comprising the rubber vulcanizate obtained by the above process.

Other embodiments of the invention encompass details about relative amounts of reactants, coagents, vulcanization accelerators and unvulcanized rubber compositions, all of which are hereinafter disclosed in the following discussion of each of the facets of the present invention.

DETAILED DESCRIPTION OF THE INVENTION

The above mentioned EP-A-0 005 617 discloses a vulcanizable rubber composition comprising (I) 100 parts by weight of a rubber comprising 40 to 100% by weight of an elastomeric copolymer of a $C_4$ or $C_5$ conjugated diene, stirene, and a glycidyl-containing monomer, and 60 to 0% by weight of a vulcanizable rubber, (II) 0.1 to 15 parts by weight of an amine salt of a carboxylic acid, and (III) 0 to 7 parts by weight of sulfur. The amine salt of a carboxylic acid acts as a crosslinking agent and reacts with the epoxy groups of the glycidyl groups-containing elastomeric copolymer (see page 4, lines 23–25). The rubber composition does not undergo scorching at the time of processing and the vulcanized rubber has a high modulus of elasticity. As an example of a suitable amine, N,N'-dimethyl-p-phenylenediamine is mentioned on page 5, line 5, of this document.

The vulcanizable rubber composition of the present invention, however, does not comprise an elastomeric copolymer having glycidyl groups.

Further, GB-A-365493 discloses a process for preparing rubber having improved resistance to deterioration which comprises incorporating in the rubber mix prior to vulcanization a primary aromatic diamine salt of an aromatic carboxylic acid, or of an aliphatic di- or tricarboxylic acid. As an example, p-phenylenediamine oxalate is mentioned. This document, however, does not disclose or suggest the use of an N,N'-disubsituted p-phenylenediamine protective agent.

Furthermore, neither EP-A-0 005 617 nor GB-A-365493 relates to the problem underlying the present invention and which is described above.

In this specification, the abbreviation "phr" means the number of parts by weight of an ingredient per 100 parts by weight of rubber (or total rubber in the case of a blend of rubbers).

The N,N'-disubstituted p-phenylenediamine protective agent to be used in accordance with the present invention is a conventional N,N'-disubstituted p-phenylenediamine derivative as has been described above. Preferably, the N,N'-disubstituted p-phenylenediamine is selected from the group consisting of N-isopropyl-N'-phenyl-p-phenylenediamine, N-(1,3-dimethyl-butyl)-N'-phenyl-p-phenylenediamine (6PPD), N,N'-bis-(1,4-dimethyl-pentyl)-p-phenylenediamine, N,N'-bis-(1-ethyl-3-methylpentyl)-p-phenylene-diamine, N,N'-diphenyl-p-phenyl-enediamine, N,N'-ditolyl-p-phenyl-enediamine, and N,N'-di-β-naphthyl-p-phenyl-enediamine. Most preferably, 6PPD is used.

The acid to be used in accordance with the present invention to form the salt with the N,N'-disubstituted p-phenylenediamine derivative typically is a carboxylic acid, preferably a $C_1$–$C_{24}$ monocarboxylic acid or a $C_2$–$C_{24}$ dicarboxylic acid. It may be a linear or branched, saturated or unsaturated mono- or dicarboxylic acid; preferably it is a linear, saturated mono- or dicarboxylic acid. More preferably, a $C_1$–$C_{24}$ monocarboxylic acid is used.

Most preferably, the carboxylic acid is a fatty acid, which typically is already present in rubber compositions as a processing aid. Most preferably, it is a $C_{12}$–$C_{20}$ fatty acid such as stearic acid.

Typcial examples of suitable acids include monocarboxylic acids such as acetic acid, propionic acid, decanoic acid; fatty acids such as dodecanoic acid (or lauric acid), tetradecanoic acid (or myristic acid), hexadecanoic acid (or palmitic acid), octadecanoic acid (or stearic acid); and dicarboxylic acids such as tartaric acid (or dihydroxysuccinic acid), fumaric acid, phthalic acid (or 1,2-benzenedicarboxylic acid), succinic acid (or butanedioic acid), glutaric acid (or 1,5-pentanedioic acid), and adipic acid (or hexanedioic acid).

For fatty acid processing aids, the reader is referred to Hofmann, *Rubber Technology Handbook*, Hanser Publishers, Munich 1989, pp. 294–307, in particular p. 299. Fatty acids, in small amounts, are primarily present as vulcanization activators.

Preferably, the amount of amine-acid salt employed in the rubber composition of the present invention is from 0.1 to 10, more preferably from 0.5 to 8, even more preferably from 0.5 to 5, and most preferably from 1 to 3 phr.

The amine-acid salt to be used in accordance with the present invention can be prepared according to methods well-known to a person skilled in the art. See, for example, GB-A-365493, page 1, lines 52–67. It was found that stearic acid and N-(1,3-dimethylbutyl)-N'-phenyl-p-phenylene-diamine (6PPD) do not form a salt in situ during mixing or vulcanization of the rubber composition. The 6PPD-stearic acid salt preferably is prepared by reacting equimolar amounts of the amine and acid in a polar protic solvent as described in the Examples.

It is to be noted that, as mentioned above, a fatty acid such as stearic acid is typically present in a rubber composition in small amounts, as a vulcanization activator and that some protective agent such as 6PPD is present to provide initial protection of the rubber vulcanizate. Hence, preferably the amine and acid should not be added to the rubber composition of the invention entirely in the form of their salt. The preferred amount of from 0.1 to 10 phr of amine-acid salt is a practical range in which the best results were obtained; however, lower or higher amounts can also be used.

Any known rubber susceptible to vulcanization with sulfur may be used in the composition according to the present invention including natural rubbers and synthetic rubbers. Preferably, natural rubber (NR) or a blend of natural rubber with polybutadiene (butadiene rubber, BR) or stirene-butadiene rubber (SBR) is used. The rubber vulcanizate in accordance with the present invention is particularly suitable for use in tire portions such as side walls and treads. According to the present invention, either sulfur or a sulfur donor is employed. The amount of sulfur to be compounded with the rubber usually is from 0.1 to 10, preferably from 0.1 to 5, more preferably from 0.5 to 3 phr. Enough of the sulfur donor to be compounded with the rubber is used to give an amount of sulfur equivalent to when sulfur itself is used.

Typical examples of sulfur donors that can be used in accordance with the present invention include dithiodimorpholine, caprolactam disulfide, tetramethylthiuram disulfide, and dipentamethylenethiuram tetrasulfide.

According to the invention, a single vulcanization accelerator or a mixture of accelerators can be employed. For vulcanization accelerators that can be used in accordance with the present invention the reader is referred to Hofmann, *Rubber Technology Handbook*, Hanser Publishers, Munich 1989. Typical vulcanization accelerators include thiazole- and benzothiazole-based accelerators, for example 2-mercaptobenzothiazole and bis(2-benzothiazolyl) disulfide (MBTS), benzothiazole-2-sulfenamide-based accelerators, such as N-cyclohexyl-benzothiazole-2-sulfenamide (CBS), N-tert-butyl-benzothiazole-2-sulfenamide (TBBS), and N,N-dicyclohexyl-benzothiazole-2-sulfenamide, 2-(4-morpholinothio)benzothiazole, N-tert-butyl-di(2-benzothiazolesulfen)-imide, thiophosphoric acid derivatives, thiurams, dithiocarbamates, diphenyl-guanidine (DPG), diorthotolyl guanidine, dithiocarbamylsulfenamides, and xanthates. Mixtures of benzothiazole-based vulcanization accelerators with diphenyl-guanidine can also be used, for example a combination of MBTS with DPG. According to the present invention, the vulcanization accelerator usually is employed in amounts from 0.1 to 8, preferably from 0.3 to 4, more preferably 0.6–2 phr.

A typical rubber composition in accordance with the present invention comprises a rubber, 0.1 to 5 phr of sulfur, 0.6 to 2 phr of a vulcanization accelerator, preferably a sulfenamide accelerator, 0.1 to 5 phr of an N,N'-disubstituted p-phenylenediamine protective agent, and 0.1 to 10 phr of the salt of an N,N'-disubstituted p-phenylenediamine derivative and a $C_{12}$–$C_{20}$ fatty acid such as stearic acid.

Preferably, the rubber composition in accordance with the present invention comprises a rubber, 0.1 to 5 phr of sulfur, 0.6 to 2 phr of a vulcanization accelerator, preferably a sulfenamide accelerator, 0.1 to 4 phr of a $C_{12}$–$C_{20}$ fatty acid such as stearic acid, 0.1 to 10 phr of zinc oxide, 0.1 to 5 phr of an N,N'-disubstituted p-phenylenediamine protective agent, and 0.1 to 10 phr of the salt of an N,N'-disubstituted p-phenylenediamine derivative and a $C_{12}$–$C_{20}$ fatty acid such as stearic acid. Metal oxides such as zinc oxide typically are added to rubber compositions.

The rubber composition of the present invention typically also comprises a reinforcing filler in a conventional amount. Any carbon black or combination of carbon black with any silica may be used.

Conventional rubber additives may also be incorporated in the rubber composition according to the present invention. Examples include antireversion agents, processing oils, tackifiers, waxes, phenolic antioxidants, pigments, e.g. titanium dioxide, resins, plasticizers, and factices. These conventional rubber additives may be added in amounts known to the person skilled in the art of rubber compounding. The reader is also referred to the Examples described below.

Further, vulcanization inhibitors, i.e. scorch retarders, such as cyclohexylthiophthalimide, phthalic anhydride, pyromellitic anhydride, benzene hexacarboxylic trianhydride, 4-methylphthalic anhydride, trimellitic anhydride, 4-chlorophthalic anhydride, salicylic acid, benzoic acid, maleic anhydride, citraconic anhydride, itaconic anhydride, and N-nitrosodiphenyl-amine may be included in conventional, known amounts.

For further details on reinforcing fillers, typical rubber additives, and vulcanization inhibitors, see Hofmann, *Rubber Technology Handbook*, Hanser Publishers, Munich 1989.

Finally, in specific applications it may also be desirable to include steel-cord adhesion promoters such as cobalt salts and dithiosulfates in conventional, known quantities.

The vulcanizable rubber composition of the present invention is vulcanized in a conventional way using means and equipment well-known to a person skilled in the art. Suitable vulcanization procedures are described in Hofmann, *Rubber Technology Handbook*, Hanser Publishers, Munich 1989.

The amine-acid salt to be used according to this invention can be incorporated into the rubber at any stage by conventional mixing procedures using standard mixing machines. A typical method comprises preparing a masterbatch in an internal mixer such as a Banbury mixer or a Werner & Pfleiderer mixer, i.e. the non-productive stage of mixing, as described in the Examples below, and subsequently adding the vulcanization system to the masterbatch on a two-roll mill, i.e. the productive stage of mixing. The rubber composition is then vulcanized. Preferably, the amine-acid salt is added during the non-productive stage of mixing.

The vulcanization process typically is carried out at a temperature of 110–220° C. for a period of up to 24 hours, more preferably at a temperature of 120–190° C. for a period of up to 8 hours.

The present invention also pertains to articles of manufacture, such as tire side walls, tire treads, pneumatic tires, and industrial rubber goods such as hoses and belts, which comprise the rubber vulcanizate obtained by the vulcanization process described above. It was found that the rubber vulcanizates which were prepared in accordance with the present invention showed comparable scorch and cure times, but improved abrasion resistance, tensile strength, elongation at break, fatigue to failure, and resistance to ozone when compared to the rubber vulcanizates of the prior art.

The invention is illustrated by the following Examples.

EXAMPLES

A masterbatch of rubber, carbon black, lubricant/softener (mineral oil), and antidegradant was made in an internal mixer. The sulfur, accelerator, and 6PPD-stearic acid salt were mixed on a two-roll mill at approx. 50–70° C.

Cure characteristics were determined using a Monsanto rheometer MDR 2000E (range 2.5–3 Nm/arc 0.5°, ISO 6502-91). Delta torque (Delta S) is the maximum torque ($M_H$) minus the minimum torque ($M_L$). Scorch time or scorch safety ($t_s2$) is the time at 2% increase of the minimum torque ($M_L$). Optimum vulcanization or cure time ($t_{90}$) is the time at 90% of the maximum torque ($M_H$). Rubber compounds were vulcanized by compression moulding at 150° C. for $t_{90}$. After cooling the vulcanized rubber sheets for 24 h, test pieces were cut and analyzed.

Tensile measurements were carried out using a Zwick 1445 tensile tester (ISO-37/2 dumb-bell).

The tensile stress-strain properties were determined in accordance with ISO 37/2, the tear strength was determined in accordance with ISO 34, the DIN abrasion (volume loss) in accordance with ISO 4649, and the fatigue to failure (0–100% extension) in accordance with ASTM 4482/85.

The ozone resistance was tested in accordance with ISO 1431-2.

The crosslink density was analyzed according to the method described by A. H. M. Schotman et al. in *Rubber Chem. Technol.*, 69 (1996), 727–741. The rubber test pieces were aged under one of the following conditions to simulate the service life of rubber during use, for example, as a tire. The test specimens were aged in an air circulation oven for 14 days at 70° C. Alternatively, the test pieces were flexed for 24 hours at 25% strain, the bloom (i.e. antidegradant diffused to the surface of the vulcanizate) was removed with acetone, and subsequently the vulcanizate was aged in an air circulation oven for 14 days at 70° C.

Preparation of N-(1,3-dimethylbutyl)-4-(phenylamino) benzenaminium octadecanoate (or stearate)

A 1 liter double-walled, oil or steam-heated reactor fitted with a reflux condenser, a thermometer, and a 6-blade impeller stirrer was charged with 500 ml of ethanol or methanol. To the stirred solvent 268 grams (1 mole) of 6PPD were added at once. After stirring for 15 minutes, 284 grams (1 mole) of stearic acid were charged to the reactor in one portion. The solution was heated and refluxed for 2 hours. Subsequently, the solvent was evaporated using a rotary evaporator.

A material having a melting range of 40–50° C. was obtained in quantitative yield. Infrared (IR) analysis indicated the complete disappearance of NH-alkyl bands between 3370 and 3390 $cm^{-1}$.

IR analysis did not indicate the formation of the amine-acid salt when the reaction was carried out in methylene chloride or hexane as the solvent.

In a similar way, the salts of 6PPD with tartaric acid, fumaric acid, phthalic acid, and succinic acid, and the salts of N-isopropyl-N'-phenyl-p-phenylenediamine (IPPD) with stearic acid, tartaric acid, fumaric acid, and phthalic acid were prepared. The 6PPD-stearic acid salt was tested as described below.

Example 1: 6PPD-stearic acid salt

Comparative Examples A–C: control with varying amounts of stearic acid and 6PPD.

TABLE 1

| | Rubber compositions | | | |
|---|---|---|---|---|
| Ingredients | A | B | 1 | C |
| NR SMR CV | 50 | 50 | 50 | 50 |
| BR Buna CB10 | 50 | 50 | 50 | 50 |
| N-220 | 50 | 50 | 50 | 50 |
| Na. Oil syn.4240 | 10 | 10 | 10 | 10 |
| Zinc oxide | 3 | 3 | 3 | 3 |
| Stearic acid | 2 | 2 | 2 | 2.5 |
| 6PPD-stearic acid | — | — | 1 | — |
| Santoflex 6PPD | 2 | 1 | 1 | 1.5 |
| Wax Sunolite 240 | 1 | 1 | 1 | 1 |
| Santocure TBBS | 0.6 | 0.6 | 0.6 | 0.6 |

TABLE 1-continued

Rubber compositions

| Ingredients | A | B | 1 | C |
|---|---|---|---|---|
| Sulfur | 2.0 | 2.0 | 2.0 | 2.0 |

TABLE 2

Cure data at 150° C.

| | A | B | 1 | C |
|---|---|---|---|---|
| Delta S, Nm | 1.38 | 1.37 | 1.35 | 1.35 |
| $t_s2$, min | 6.7 | 7.1 | 6.9 | 7.0 |
| $t_{90}$, min | 14.2 | 14.8 | 14.6 | 14.7 |

The results in Table 2 show that the scorch time and the optimum vulcanization time of the rubber vulcanizate in accordance with the invention are comparable to the values for conventional rubber vulcanizates.

TABLE 3

Properties of rubber vulcanizates (cure: 150° C./$t_{90}$)

| | A | B | 1 | C |
|---|---|---|---|---|
| M100, MPa | 1.7 | 1.8 | 1.8 | 1.9 |
| M300, MPa | 7.9 | 8.5 | 8.5 | 8.3 |
| Tensile, MPa | 24.7 | 24.8 | 24.5 | 23.8 |
| Elongation, % | 630 | 620 | 620 | 600 |
| Tear, kN/m | 125 | 110 | 130 | 107 |
| DIN abrasion, mm$^3$ | 125 | 148 | 115 | 140 |
| Fatigue to failure, kC | 235 | 206 | 250 | 203 |

The results in Table 3 show that the rubber vulcanizate in accordance with the present invention has an improved abrasion resistance over rubber vulcanizates of the prior art.

TABLE 4

Properties of vulcanizates (cure: 150° C./$t_{90}$, aged 70° C./14 d)

| | A | B | 1 | C |
|---|---|---|---|---|
| M100, MPa | 2.2 | 2.0 | 2.0 | 2.2 |
| M300, MPa | 12.8 | 10.9 | 12.5 | 11.2 |
| Tensile, MPa | 22.6 | 20.2 | 24.1 | 19.7 |
| Elongation, % | 550 | 480 | 580 | 470 |
| Fatigue to failure, kC | 130 | 90 | 170 | 100 |

The results in Table 4 show that, after ageing, the rubber vulcanizate in accordance with the present invention shows improved properties with respect to tensile strength, elongation at break, and fatigue to failure over the vulcanizates of the prior art.

TABLE 5

Fatigue to failure results

| | A | B | 1 | C |
|---|---|---|---|---|
| Fatigue to failure, kC | 235 | 205 | 250 | 203 |
| Fatigue to failure, kC (aged)$^1$ | 130 | 90 | 170 | 100 |
| Fatigue to failure, kC (aged)$^2$ | 110 | 80 | 180 | 100 |

TABLE 5-continued

Fatigue to failure results

| | A | B | 1 | C |
|---|---|---|---|---|

$^1$Aged (70° C./14 d)
$^2$Aged (flexed/bloom removed/aged 70° C./14 d)

The results in Table 5 show that, after ageing under different conditions, the rubber vulcanizate in accordance with the present invention has a much improved fatigue to failure as compared to that of a conventional rubber vulcanizate.

TABLE 6

Ozone resistance$^1$

| | A | B | 1 | C |
|---|---|---|---|---|
| First crack, h | 2 | 2 | 2 | 2 |
| Break, h | 192 | 144 | 216 | 144 |

$^1$Aged (flexed/bloom removed/aged 70° C./14 d) and then subjected to ozone (50 ppm; 50% RH, 40° C.)

The results in Table 6 show that the resistance to ozone is much better in a rubber vulcanizate in accordance with the present invention than in a rubber vulcanizate of the state of the art.

TABLE 7

Crosslink density$^1$ (cure: 150° C./$t_{90}$, aged 70° C./14 d)

| | A | B | 1 | C |
|---|---|---|---|---|
| Unaged | | | | |
| Total | 5.05 | 5.09 | 5.10 | 5.05 |
| Polysulfidic | 4.01 | 3.90 | 4.05 | 3.86 |
| Disulfidic | 0.83 | 0.79 | 0.76 | 0.81 |
| Monosulfidic | 0.21 | 0.40 | 0.29 | 0.38 |
| Aged | | | | |
| Total | 5.30 | 5.10 | 5.20 | 5.15 |
| Polysulfidic | 2.70 | 2.15 | 3.70 | 2.35 |
| Disulfidic | 0.60 | 0.55 | 0.77 | 0.57 |
| Monosulfidic | 2.00 | 2.40 | 0.73 | 2.23 |

$^1$Expressed in moles/g of rubber × $10^5$

The results in Table 7 show that, after ageing, the amount of polysulfidic crosslinks is much higher in a rubber vulcanizate in accordance with the present invention than in a conventional rubber vulcanizate.

From a comparison of the results in Tables 1–7 for Example 1 and Comparative Example C it can be concluded that there is no formation of the amine-acid salt in situ and that only when this salt is added as such to the rubber composition, the advantages shown in Tables 1–7 are obtained.

What is claimed is:

1. A vulcanizable rubber composition comprising a rubber, sulfur or a sulfur donor, a vulcanization accelerator, a protective agent and 0.1 phr or more of an N,N'-disubstituted p-phenylenediamine protective agent selected from the group consisting of N-isopropyl-N'-phenyl-p-phenylenediamine, N-(1,3-dimethyl-butyl)-N'-phenyl-p-phenylenediamine (6PPD), N,N'-bis-(1,4-dimethyl-pentyl)-p-phenylenediamine, N,N'-bis-(1-ethyl-3-methylpentyl)-p-phenylenediamine, N,N'-diphenyl-p-phenylenediamine, N,N'-ditolyl-p-phenylenediamine, and N,N'-di-β-napthyl-p-phenylenediamine, present in the form of a salt with a $C_1$–$C_{24}$ monocarboxylic acid or a $C_2$–$C_{24}$ dicarboxylic acid, said composition not comprising an elastomeric copolymer having glycidyl groups.

2. The composition of claim 1 wherein the composition comprises from 0.1 to 10 phr of the salt.

3. The composition of claim 1 wherein the acid is a fatty acid.

4. The composition of claim 3 wherein the acid is a $C_{12}$–$C_{20}$ fatty acid.

5. The composition of claim 1 wherein the p-phenylenediamine is 6PPD.

6. The composition of claim 1 wherein the rubber is natural rubber or a blend of natural rubber with polybutadiene or stirene-butadiene rubber.

* * * * *